United States Patent
Cheng et al.

(10) Patent No.: US 12,198,721 B2
(45) Date of Patent: Jan. 14, 2025

(54) HEAT-ASSISTED MAGNETIC RECORDING HEAD NEAR-FIELD TRANSDUCER WITH A HYBRID PLASMONIC DISK

(71) Applicant: Seagate Technology LLC, Fremont, CA (US)

(72) Inventors: Yuhang Cheng, Edina, MN (US); Tae-Woo Lee, Eden Prairie, MN (US); Michael A. Seigler, Eden Prairie, MN (US); Yang Wu, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/523,005

(22) Filed: Nov. 29, 2023

(65) Prior Publication Data

US 2024/0096369 A1 Mar. 21, 2024

Related U.S. Application Data

(63) Continuation of application No. 17/807,248, filed on Jun. 16, 2022, now Pat. No. 11,900,963.

(51) Int. Cl.
| | |
|---|---|
| *G11B 13/08* | (2006.01) |
| *G11B 5/31* | (2006.01) |
| *G11B 5/48* | (2006.01) |
| *G11B 5/60* | (2006.01) |
| *G11B 5/00* | (2006.01) |

(52) U.S. Cl.
CPC .............. *G11B 13/08* (2013.01); *G11B 5/314* (2013.01); *G11B 5/4866* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,391,108 B2 * | 3/2013 | Peng | G11B 5/6088 369/112.27 |
| 9,384,770 B2 * | 7/2016 | Chen | G11B 5/314 |
| 9,626,991 B2 | 4/2017 | Chen | |
| 9,728,209 B2 | 8/2017 | Chen | |
| 10,490,214 B1 | 11/2019 | Chen | |
| 10,490,221 B1 | 11/2019 | Chen | |
| 10,832,717 B1 | 11/2020 | Cheng | |
| 11,532,329 B1 * | 12/2022 | Matsumoto | G11B 13/08 |
| 11,900,963 B2 * | 2/2024 | Cheng | G11B 5/6088 |
| 2012/0263024 A1 * | 10/2012 | Jin | B82Y 10/00 216/22 |

(Continued)

FOREIGN PATENT DOCUMENTS

WO   WO 2016191707 A1   12/2016

*Primary Examiner* — Peter Vincent Agustin
(74) *Attorney, Agent, or Firm* — Mueting Raasch Group

(57) ABSTRACT

A heat-assisted magnetic recording head comprises a near-field transducer (NFT). The NFT comprises a near-field emitter configured to heat a surface of a magnetic disk, and a hybrid plasmonic disk. The hybrid plasmonic disk comprises a plasmonic region and a thermal region. The plasmonic region comprises a first material or alloy that is a plasmonic material or alloy. The thermal region comprises a second material or alloy that is different than the first material or alloy.

11 Claims, 4 Drawing Sheets

(56) References Cited

U.S. PATENT DOCUMENTS

| | | | |
|---|---|---|---|
| 2014/0251948 A1* | 9/2014 | Zhao | G11B 5/314 |
| | | | 216/24 |
| 2015/0085630 A1* | 3/2015 | Macken | G11B 5/4866 |
| | | | 369/13.33 |
| 2016/0351211 A1* | 12/2016 | Blaber | G11B 5/6082 |
| 2019/0057717 A1* | 2/2019 | Chen | G11B 5/314 |
| 2022/0415354 A1* | 12/2022 | Cheng | G11B 5/314 |
| 2023/0410843 A1* | 12/2023 | Cheng | G11B 5/6088 |
| 2024/0096369 A1* | 3/2024 | Cheng | G11B 5/4866 |

* cited by examiner

HEAT-ASSISTED MAGNETIC RECORDING HEAD NEAR-FIELD TRANSDUCER WITH A HYBRID PLASMONIC DISK

This application is a continuation of U.S. patent application Ser. No. 17/807,248 filed Jun. 16, 2022, entitled "HEAT-ASSISTED MAGNETIC RECORDING HEAD NEAR-FIELD TRANSDUCER WITH A HYBRID PLASMONIC DISK", the entire contents of which are hereby incorporated by reference.

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. The process of generating and condensing localized surface plasmons (LSPs) on the NFT to produce the hot spot generates enormous amounts of heat which may degrade and/or deform various components of the NFT, thus potentially reducing the performance and/or life expectancy of the HAMR head and the HDD.

SUMMARY

The present disclosure describes a heat-assisted magnetic recording (HAMR) head having a near-field transducer (NFT) that includes a hybrid plasmonic disk. The hybrid plasmonic disk includes a plasmonic region and a thermal region. The plasmonic region includes a material which has relatively good optical properties and plasmonic efficiency (e.g., plasmonic figure of merit or another measure of plasmons generated per incident photon). The thermal region includes a material or alloy which demonstrates better thermal stability than the material or alloy of the plasmonic region. In one example, a thermal region is disposed near a portion of the NFT which typically sees the highest temperatures during a HAMR write cycle, such as near a peg portion of a near-field emitter. In one example, the plasmonic region may be disposed near a region of the NFT where a high rate of plasmonic generation occurs, such as near a waveguide. Such a hybrid plasmonic disk may be more thermally stable and have increased longevity relative other HAMR heads.

In one example, a HAMR head comprises an NFT comprising a near-field emitter configured to heat a surface of a magnetic disk; and a hybrid plasmonic disk comprising a plasmonic region comprising a plasmonic material, and a thermal region comprising a material that is different than the plasmonic material.

In another example, a HAMR head comprises an NFT comprising a near-field emitter configured to heat a surface of a magnetic disk; and a hybrid plasmonic disk comprising a plurality of plasmonic regions and a plurality of thermal regions.

These and other features and aspects of various examples may be understood in view of the following detailed discussion and accompanying drawings.

DETAILED DESCRIPTION

Figure 1:
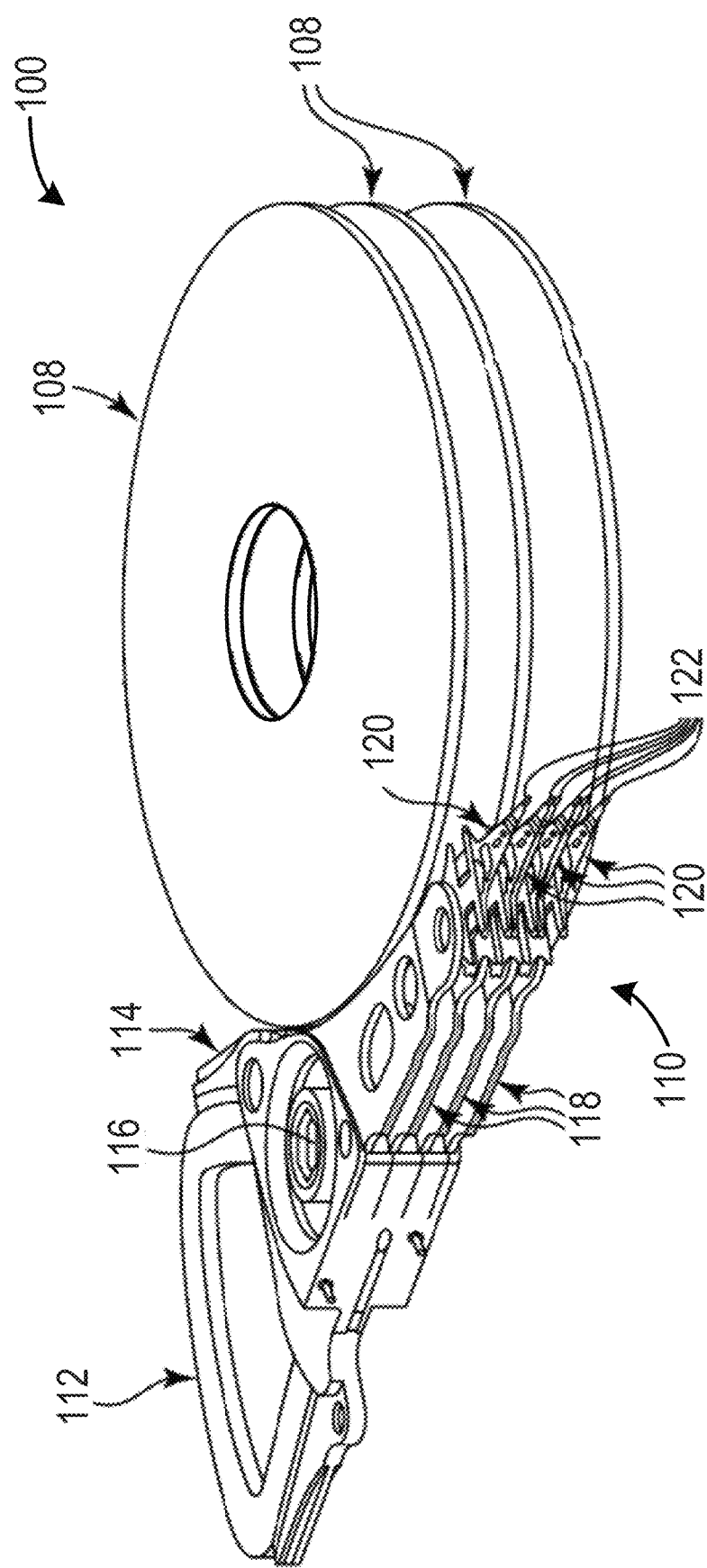
FIG. 1 is a perspective view of an example hard disk drive, in accordance with aspects of this disclosure.

FIG. 1 is a perspective view of an example heat assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. Each slider 122 includes a heat-assisted magnetic recording (HAMR) head configured to read data from and write data to a surface of a respective magnetic disk 108. In one example, each HAMR head includes a writer, a reader, a heater (e.g., a reader heater, a writer heater), and a near-field transducer (NFT).

HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
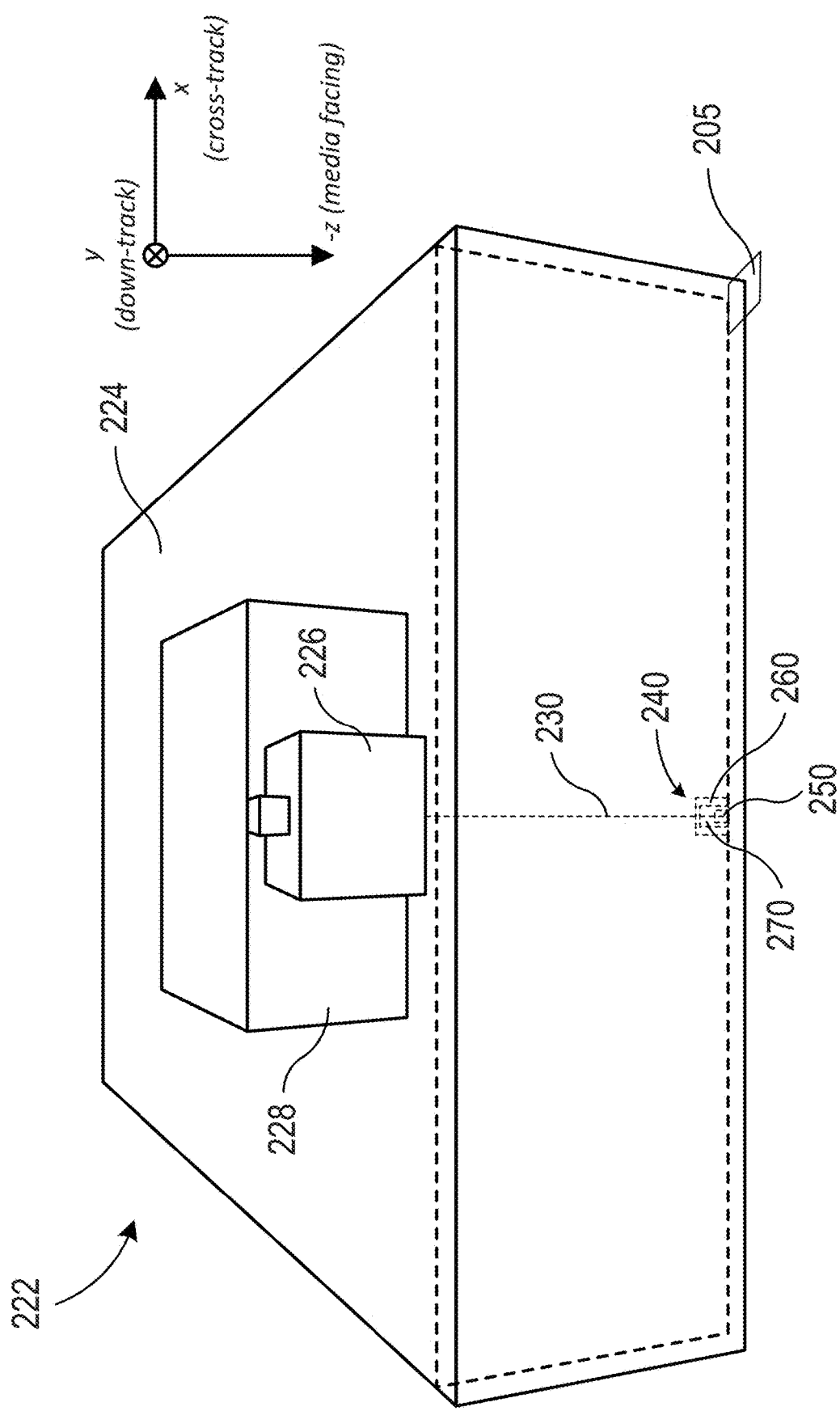
FIG. 2 is a perspective view of an example heat-assisted magnetic recording (HAMR) slider, in accordance with aspects of this disclosure.

FIG. 2 is a perspective view of an example slider 222, in accordance with aspects of this disclosure. Slider 222 may be an example of slider 122 of FIG. 1. Slider 222 includes a slider body 224, a laser 226, a submount 228, and a HAMR head 240. HAMR head 240 includes a waveguide 230, a near-field transducer (NFT) 250, a writer 260, and a reader 270. In the example of FIG. 2, some features or parts of features of NFT 250, writer 260, and reader 270 are presented on a media-facing air-bearing surface (ABS) 205 that is positioned over a surface of a magnetic disk (not shown) during some operations of the HDD (e.g., write operations, read operations, data maintenance operations). During such operations, ABS 205 faces and is held proximate to the moving magnetic disk surface by a cushion of gas, known as an active air bearing (AAB), that is produced from a dynamic flow of gas across a pattern of recessed subsurfaces bound within the volume of slider body 224 by ABS 205.

Laser 226 is configured to emit photons of a target wavelength. In some examples, laser 226 emits photons with a wavelength in the near infrared range (e.g., approximately 830 nm) or visible range. Examples of laser 226 include an optically pumped semiconductor laser, a quantum well laser, an integrated laser, or other suitable laser. Laser 226 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

Laser 226 is coupled to slider body 224 via submount 228. In the example of FIG. 2, laser 226 and submount 228 are located on a face of slider body 224 which is opposite to ABS 205. In other example HAMR sliders, a laser may be directly mounted to the slider body. Submount 228 may be configured to redirect photons output from laser 226 so that the photons are directed into waveguide 230 in the negative z-direction of FIG. 2 (e.g., toward NFT 250). The path between laser 226 and waveguide 230 may include one or more optical couplers, mode converters, and/or mode couplers. Waveguide 230 is formed integrally within slider body 224 and is configured to deliver photons from laser 226 to NFT 250.

NFT 250 is configured to create a small hot spot on a magnetic disk. For example, NFT may generate and support a distribution of localized surface plasmons (LSPs) upon receiving incident photons from laser 226 by way of waveguide 230 and may condense the LSP distribution on an area or feature of NFT 250. NFT 250 amplifies a near-field of the condensed LSP distribution and focuses the near-field toward a surface of a magnetic disk (e.g., a magnetic disk 108 of FIG. 1) to produce a hot spot. Writer 260 is configured to generate a magnetic field from an electrical current and aim the magnetic field at the hot spot on the magnetic disk. The near-field energy heats and lowers the coercivity of the magnetic grains in the hot spot, thereby enabling magnetic moments of these magnetic grains to be oriented by the magnetic field generated by writer 260. Turning off laser 226 or moving NFT 250 toward a different location of the magnetic disk (or moving the magnetic disk such that NFT 250 faces a different location of the magnetic disk) removes the focused near-field energy from the hot spot. Removing the near-field energy allows the magnetic grains contained in the spot to cool. The cooling locks in the magnetic moment orientation induced by the magnetic field generated by writer 260, thus preserving the bits of written data.

Figure 3:
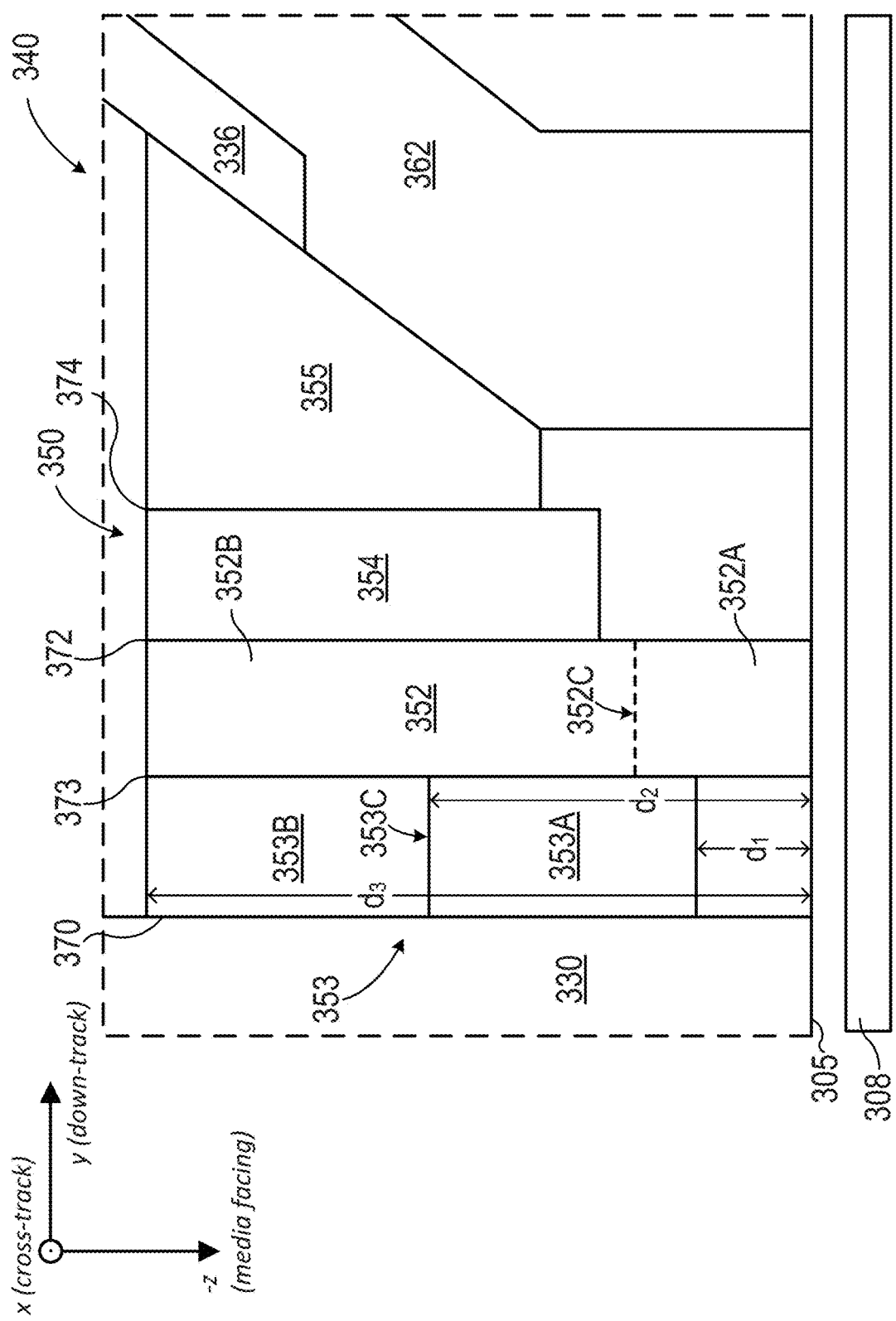
FIG. 3 is a cross-sectional view of an example HAMR head, in accordance with aspects of this disclosure.

FIG. 3 is a cross-sectional view of an example HAMR head, in accordance with aspects of this disclosure. HAMR head 340 includes a waveguide 330, an NFT 350, a write pole 362, and a diffuser 336.

A light source, such as laser 226 of FIG. 2, emits photons of a target wavelength range (e.g., near infrared, visible). In some instances, laser 226 emits a distribution of photons with a median wavelength of approximately 800 nm to approximately 900 nm. Waveguide 330 is configured to support LSP generation on NFT 350 by directing photons from the light source toward NFT 350. In some examples, a waveguide includes at least two layers that include different materials. Waveguide 330, for example, may include a waveguide core and a core-to-NFT spacing (CNS) layer. In one example, a material of a first layer has a refractive index that is different than the refractive index of a material of a second layer. In some examples, the momentum of an incident photon in a first material is shifted upon transmission into a second material, which may be caused by the difference in the refractive indices of the materials of the first and second layers.

LSPs are generated on NFT 350 through resonance coupling of photons from the light source with free electrons of NFT 350. NFT 350 is configured to condense LSPs of NFT 350, amplify a near field of the LSPs, and emit a near-field to produce a hot spot on a magnetic disk 308. Near-field and a magnetic field from write pole 362 are directed to be partially coincident on spot such that the temperature increase resulting from near-field reduces the magnetic coercivity of the grains within hot spot and enables the magnetic field from write pole 362 to orient magnetic moments of the grains more easily, thus producing more stable bits of written data upon cooling.

NFT 350 may include a heat sink 355 that is configured to draw heat away from regions of NFT 350 and direct the heat toward other regions of HAMR head 340. In the example of HAMR head 340, heat sink 355 is coupled to diffuser 336. Heat sink 355 may include a thermally conductive material, such as gold. Including a material with high thermal conductivity in heat sink 355 may improve heat dissipation away from thermally sensitive regions of NFT 350.

In some examples, heat sink 355 includes a thermally stable material. Examples of thermally stable materials include rhodium, copper, tungsten, tantalum, iridium, platinum, ruthenium, nickel, and iron. Including one or more thermally stable materials in heat sink 355 may improve the ability of heat sink 355 to dissipate heat more effectively and/or consistently and may extend the lifetime of HAMR head 340. In some examples, including one or more thermally stable materials in heat sink 355 may improve its resistance to thermal defects such as voiding, deformation, recession, and/or delamination from other surrounding features.

Diffuser 336 is a heat sink that is configured to draw heat from NFT 350 and dissipate the heat toward other areas of HAMR head 340 (e.g., toward other heat sinks). Diffuser 336 may include a thermally conductive material and/or a thermally stable material. In some examples, drawing heat away from regions of an NFT which are prone to thermal degradation may reduce defect formation and/or extend the operating lifetime of the HAMR head.

NFT 350 may include a middle disk (MDSC) 354. MDSC 354 is configured to direct LSPs toward an emitting region of a respective near-field emitter 352 and/or mitigate background fields. MDSC 354 may include a thermally conductive material (e.g., gold) and/or a thermally stable material (e.g., iridium, rhodium). In the example of FIG. 3, heat sink 355 and MDSC are coupled to each other at interface 374. Interface 374 may be substantially orthogonal to air-bearing surface 305 and includes a surface of MDSC and a surface of heat sink 355.

NFT 350 includes a near-field emitter 352. Near-field emitter 352 is configured to emit near-field to produce hot spot on magnetic disk 308. In the example of FIG. 3, MDSC 354 and near-field emitter 352 are coupled to each other at interface 372. In some examples, interface 372 is substantially orthogonal to air-bearing surface 305 and includes a surface of near-field emitter 352 and a surface of MDSC 354.

Near-field emitter 352 may include a peg 352A and a disk 352B. Peg 352A is disposed near air-bearing surface 305 of HAMR head 340. In some instances, one or more portions of peg 352A are exposed on air-bearing surface 305. In some examples, disk 352B is coupled to peg 352A and is disposed behind peg 352A relative to air-bearing surface 305 (e.g., in the z-direction). Disk 352B is configured to serve as an anchor for peg 352A. Peg 352A may be narrower in profile than disk 352B. In some examples, near-field emitter 352 is a single feature, with peg 352A and disk 352B being two regions of a continuous piece. In these examples, near-field emitter 352 may taper or narrow toward peg 352A. Peg 352A may protrude from disk 352B in the vicinity of air-bearing surface 305.

In other examples, peg 352A and disk 352B are separate, discrete features separated by a defined interface 352C. In examples where peg 352A and disk 352B are two regions of a continuous piece, peg 352A and disk 352B may include the same material(s). For example, peg 352A and disk 352B may both include iridium, rhodium, ruthenium, or a gold alloy. In some examples, peg 352A and disk 352B include different materials (e.g., different elements, different alloys, different composites). For example, peg 352A may include iridium, ruthenium, a gold alloy, or a gold composite, and disk 352B may include gold or a different gold alloy or gold composite than peg 352A (e.g., a gold alloy with a different alloying metal, a gold alloy with a different concentration of the same alloying metal that peg 352A includes).

Disk 352B is configured to receive and support a distribution of LSPs. In some examples, disk 352B is configured to participate in LSP generation. Peg 352A is configured to emit near-field to generate hotspot on magnetic disk 308. For example, peg 352A may generate hotspot by receiving and condensing a distribution of LSPs, amplifying a near-field of the LSP distribution, and emitting amplified near-field toward the surface of magnetic disk 308.

NFT 350 includes a plasmonic disk 353. Plasmonic disk 353 is configured to generate and support LSPs through resonance coupling with incident photons which are generated by a light source (e.g., laser 226 of FIG. 2) and are directed toward NFT 350 by waveguide 330.

In accordance with aspects of this disclosure, plasmonic disk 353 is a hybrid plasmonic disk that includes a plasmonic region and a thermal region. In one example, region 353A is the thermal region and region 353B is the plasmonic region. In another example, region 353A is the plasmonic region and region 353B is the thermal region. The plasmonic region is configured to support LSP generation through coupling with incident photons from a light source. The thermal region is configured to mitigate thermal exposure of and defect formation in the plasmonic region.

Regions 353A and 353B are coupled to each other and provided in a layered configuration. Regions 353A and 353 are coupled to each other at an interface 353C which is substantially parallel to air-bearing surface 305 of HAMR head 340. Interface 353C includes a surface of region 353A (e.g., the plasmonic region) and a surface of region 353B (e.g., the thermal region).

The layered configuration of region 353A and region 353B is oriented along an axis which is substantially perpendicular to air-bearing surface 305 (e.g., along the z axis of FIG. 3). This axis defines a layering dimension which can be used to describe the positions of the plasmonic region and the thermal region in plasmonic disk 353. Region 353A includes a first end proximate to air-bearing surface 305 and peg 352A of near-field emitter 352. The first end of region 353A is a distance $d_1$ from air-bearing surface 305 in the layering dimension. Region 353A includes a second end opposite the first end. The second end is a greater distance $d_2$ from air-bearing surface 305 in the layering dimension. A first end of region 353B is coupled to the second end of region 353A. Region 353B included a second end which is a distance $d_3$ from air-bearing surface 305 in the layering dimension. Distance $d_3$ is greater than distance $d_2$.

The plasmonic region of plasmonic disk 353 includes a plasmonic material. As used herein, a plasmonic material is a material which possesses properties (e.g., electrical properties, optical properties) which promote resonance coupling between photons incident upon the plasmonic material and free electrons of the plasmonic material. Such resonant coupling of a photon with free electrons of the plasmonic material may excite one or more plasmonic modes of the plasmonic material, which may result in the generation of an LSP on a surface of the plasmonic material. Plasmonic materials which demonstrate efficient plasmon generation in response to photons of a wavelength target or range are said to have a high plasmonic figure of merit.

A plasmonic material may be selected based on its optical properties, electrical properties, and/or plasmon-related properties such as its plasmonic figure of merit. In some examples, the plasmonic material includes gold, silver, ruthenium, copper, aluminum, rhodium, or combinations thereof. The plasmonic material may further include a secondary material that is configured to provide thermal stability to the plasmonic region. Examples of secondary materials include alloying metals and nanoparticles. Examples of alloying metals include rhodium, copper, tungsten, tantalum, iridium, platinum, nickel, bismuth, indium, tin, manganese, holmium, lutetium, praseodymium, scandium, uranium, barium, cesium, dysprosium, europium, rubidium, terbium, gadolinium, samarium, thallium, cadmium, neodymium, lead, hafnium, niobium, erbium, magnesium, palladium, vanadium, zinc, chromium, iron, lithium, sodium, strontium, calcium, yttrium, thorium, beryllium, thulium, ytterbium, promethium, neodymium, cobalt, cerium, and lanthanum. Examples of nanoparticles include yttrium oxide nanoparticles and transparent conductive oxide (TCO) nanoparticles such as zinc oxide nanoparticles. For example, the plasmonic material included in the plasmonic region may be an alloy such as a gold alloy or a silver alloy, or it may be a plasmonic metal and nanoparticle dispersion (e.g., gold with dispersed nanoparticles, such as yttrium oxide nanoparticles or zinc oxide nanoparticles).

The thermal region of plasmonic disk 353 includes a material that is different than the plasmonic material. In some examples, one material may be different than another material if the materials include different elements (e.g., a first material is gold and a second material is rhodium). In another example, one material may be different than another material if the materials include different concentrations of the same elements or different phases of the same elements. In other words, a material such as an alloy or a composite which is used in both the thermal region and the plasmonic region is considered different if the relative concentrations of its included materials are different in each region. For example, plasmonic region 353A may both include a material AuRh (e.g., 90% gold, 10% rhodium) and thermal region 353B may include a different material AuRh (30% gold and 70% rhodium).

A material that is included in the thermal region may be selected based on properties related to its thermal robustness, such as its melting point and/or its resistance to defects such as voiding and grain boundary migration. In some examples, a melting point of the thermal region of plasmonic disk 353 may be higher than a melting point of the plasmonic region of plasmonic disk 353. In some examples, a plasmonic figure of merit of the plasmonic region of plasmonic disk 353 is higher than a plasmonic figure of merit of the thermal region of plasmonic disk 353.

In some examples, the thermal region of plasmonic disk 353 includes rhodium, iridium, and/or an alloy comprising rhodium, iridium, gold, silver, copper, and/or aluminum. An alloy of the thermal region of plasmonic disk 353 may include rhodium, iridium, gold, silver, copper, and/or aluminum as a primary material (e.g., a material that constitutes a majority of the composition of plasmonic disk 353), and one or more alloying metals. In some examples, the inclusion of an alloying metal in a primary material of plasmonic disk 353 improves the thermal robustness of plasmonic disk 353 (e.g., by impeding defect formation and migration, by stabilizing grain size).

In one example, the thermal region is disposed in a portion of the hybrid plasmonic disk that is exposed to high thermal stress, such as near a peg of a near-field emitter. In some instances, the thermal region may shield the plasmonic region from some of the heat which is produced in the NFT. In other examples, the thermal region may mitigate deformation, diffusion, voiding, recession, and/or other physical defects in the plasmonic region which may result from repeated and/or sustained thermal exposure. The plasmonic region may be disposed in a portion of hybrid plasmonic disk 353 that enables the plasmonic region to receive incident photons and efficiently convert them to LSPs.

In an example where region 353A is a plasmonic region and region 353B is a thermal region, the thermal region (i.e., region 353B) is disposed behind the plasmonic region (e.g., region 353A) relative to air-bearing surface 305 and the layering dimension along the z-axis. Disposing the plasmonic region proximate to peg 352A may enable more efficient transfer of LSPs to peg 352A. Disposing the thermal region behind the plasmonic region may, in some examples, reduce thermally-induced deformation of the plasmonic region. For example, the thermal region may reduce recession and/or diffusion of a material included in the plasmonic region. This relative orientation of the plasmonic region and the thermal region may preserve the shape and/or structure of the plasmonic region, and may enable sustained performance and/or longer lifetime of HAMR head 340.

In an example where region 353A is a thermal region and region 353B is a plasmonic region, the plasmonic region (e.g., region 353B) is disposed behind the thermal region (e.g., region 353A) relative to air-bearing surface 305 and the layering dimension along the z-axis. Disposing the thermal region proximate to peg 352A may reduce the thermal exposure of the plasmonic region. Disposing the plasmonic region between waveguide 330 and disk 352B of near-field emitter 352 may support the generation of LSPs on NFT 350 and transfer of the LSPs to peg 352A.

Hybrid plasmonic disk 353 and waveguide 330 are coupled to each other at an interface 370. Interface 370 may be substantially orthogonal to air-bearing surface 305. Interface 370 includes a surface of hybrid plasmonic disk 353 and a surface of waveguide 330. The surface of hybrid plasmonic disk 353 includes a surface of the plasmonic region and a surface of the thermal region (e.g., a surface of region 353A and a surface of region 353B).

Hybrid plasmonic disk 353 and near-field emitter 352 are coupled to each other at an interface 373. Interface 373 may be substantially orthogonal to air-bearing surface 305. Interface 373 includes a surface of hybrid plasmonic disk 353 and a surface of near-field emitter 352. The surface of hybrid plasmonic disk 353 includes a surface of the plasmonic region and a surface of the thermal region (e.g., a surface of region 353A and a surface of region 353B).

Materials which are commonly included in HAMR NFTs (e.g., gold) are often prone to thermal defects, instability, and degradation at temperatures which are encountered by the HAMR head under normal operating conditions. Repeated and prolonged thermal exposure of the NFT may lead to thermal degradation, physical defects, deformation, and/or recession of its features. Such degradation and defects may reduce the performance and/or shorten the lifetime of a HAMR head, as well as increase the laser power required to maintain the LSP density needed for HDD operation and further accelerate defect formation and migration. A hybrid plasmonic disk which includes a plasmonic region and a thermal region may, in some instances, enable plasmonic efficiency (e.g., plasmonic figure of merit) of its associated NFT to be maintained while increasing thermal stability of the NFT relative to other NFTs. Providing regions of the hybrid plasmonic disk with distinct functions (e.g., LSP generation for the plasmonic region, thermal reinforcement for the thermal region) may enable the hybrid plasmonic disk to have a prolonged lifetime and sustained plasmonic performance resulting from the increased thermal robustness.

Figure 4:
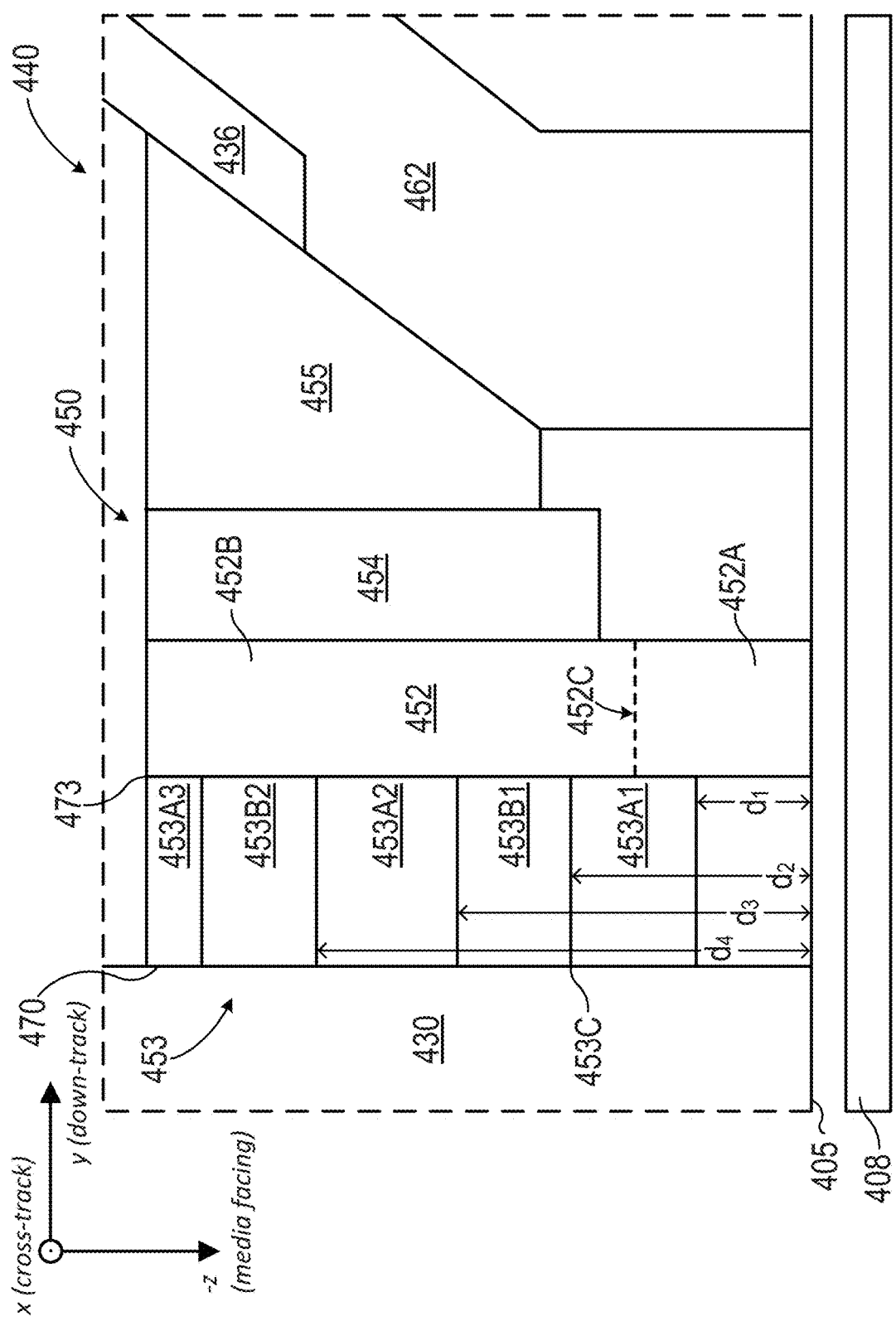
FIG. 4 is a cross-sectional view of an example HAMR head, in accordance with aspects of this disclosure.

FIG. 4 is a cross-sectional view of an example HAMR head, in accordance with aspects of this disclosure. HAMR head 440 includes a waveguide 430, an NFT 450, a write pole 462, and a diffuser 436. NFT 450 includes a near-field emitter 452 and a plasmonic disk 453, and may include a MDSC 454 and/or a heat sink 455. Near-field emitter 452 includes a peg 452A and a disk 452B. In some examples, near-field emitter 452 is a single feature, with peg 452A and disk 452B being two regions of a continuous piece. In other examples, peg 452A and disk 452B are separate, discrete features separated by a defined interface 452C. In some examples, peg 452A and disk 452B include different materials.

Plasmonic disk 453 is a hybrid plasmonic disk that includes a plurality of plasmonic regions and a plurality of thermal regions. In one example, regions 453A are the thermal regions and regions 453B are the plasmonic regions. In another example, regions 453A are the plasmonic regions and regions 453B are the thermal regions.

Regions 453A1, 453A2, and 453A3 (collectively regions 453A), and regions 453B1 and 453B2 (collectively regions 453B) are provided in an alternating layered configuration. In one example, regions 453A are plasmonic regions and regions 453B are thermal regions. In one example, regions 453A are thermal regions and regions 453B are plasmonic regions. A plasmonic region and a thermal region may be coupled to each other at an interface (e.g., interface 453C) which is substantially parallel to air-bearing surface 405. Interface 453C includes a surface of a plasmonic region and a surface of a thermal region (i.e., a surface of a region 453A and a surface of a region 453B, respectively, or a surface of a region 453B and a surface of a region 453A, respectively).

The layering of regions 453A and 453B is oriented along an axis which is substantially perpendicular to an air-bearing surface 405 of HAMR head 440 (e.g., along the z axis of FIG. 4). This axis defines a layering dimension which can be used to describe the positions of the plasmonic region and the thermal region in plasmonic disk 453. A first region 453A1 includes a first end proximate to air-bearing surface 405 of the heat-assisted magnetic recording head and peg 452A of near-field emitter 452. The first end of first region 453A1 is a distance $d_1$ from air-bearing surface 405 in the layering dimension. First region 453A1 includes a second end opposite the first end. The second end of first region 453A1 is a second, greater distance $d_2$ from air-bearing surface 405 in the layering dimension. A second region 453B1 includes a first end that is coupled to the second end of first region 453A1. Second region 453B1 includes a second end which is a distance $d_3$ from air-bearing surface 405 in the layering dimension. Distance $d_3$ is greater than distance $d_2$. A third region 453A2 includes a first end that is coupled to the second end of second region 453B1. Third region 453A2 includes a second end which is a distance $d_4$ from air-bearing surface 405 in the layering dimension. Distance $d_4$ is greater than distance $d_3$.

Hybrid plasmonic disk 453 and waveguide 430 are coupled to each other at an interface 470. Interface 470 may be substantially orthogonal to air-bearing surface 405. Interface 470 includes a surface of hybrid plasmonic disk 453 and a surface of waveguide 430. The surface of hybrid plasmonic disk 453 includes a surface of at least one of the plurality of plasmonic regions and a surface of at least one of the plurality of thermal regions.

Hybrid plasmonic disk 453 and near-field emitter 452 are coupled to each other at an interface 473. Interface 473 may be substantially orthogonal to air-bearing surface 405. Interface 473 includes a surface of hybrid plasmonic disk 453 and a surface of near-field emitter 452. The surface of hybrid plasmonic disk 453 includes a surface of at least one of the plurality of plasmonic regions and a surface of at least one of the plurality of thermal regions.

What is claimed is:

1. A heat-assisted magnetic recording head comprising:
    a near-field transducer positioned between a waveguide and a write pole along a direction parallel to a media-facing surface of the heat-assisted magnetic recording head, the near-field transducer comprising:
    a near-field emitter having a disk portion and a peg portion, the peg portion being narrower in profile than the disk portion and protruding toward the media-facing surface, the peg portion configured to emit an amplified near-field of local surface plasmons to thereby heat a surface of magnetic media positioned near the media-facing surface; and
    a hybrid plasmonic disk disposed between the waveguide and the near-field emitter such that the hybrid plasmonic disk forms a first interface with the waveguide and a second interface with the near-field emitter, the first and second interfaces being substantially orthogonal to the media-facing surface, the hybrid plasmonic disk comprising a plasmonic region configured to generate localized surface plasmons from light directed into the near-field transducer by the waveguide, and a thermal region different from the plasmonic region and configured to mitigate thermal exposure of the plasmonic region.

2. The heat-assisted magnetic recording head of claim 1, wherein the plasmonic region and the thermal region are coupled to each other in a layered configuration oriented along an axis that is substantially perpendicular to the media-facing surface.

3. The heat-assisted magnetic recording head of claim 2, wherein the plasmonic region is closer to the peg portion of the near-field emitter and the thermal region is farther from the peg portion.

4. The heat-assisted magnetic recording head of claim 2, wherein the thermal region is closer to the peg portion of the near-field emitter and the plasmonic region is farther from the peg portion.

5. The heat-assisted magnetic recording head of claim 1, further comprising a heat sink disposed between the near-field transducer and the write pole.

6. The heat-assisted magnetic recording head of claim 1, wherein the thermal region comprises a material having a melting point that is higher than a melting point of material included in the plasmonic region.

7. The heat-assisted magnetic recording head of claim 1, wherein the plasmonic material comprises gold, silver, ruthenium, copper, aluminum, rhodium, or combinations thereof.

8. The heat-assisted magnetic recording head of claim 1, wherein the material included in the thermal region comprises rhodium, iridium, and/or an alloy comprising rhodium, iridium, gold, silver, copper, and/or aluminum.

9. The heat-assisted magnetic recording head of claim 1, wherein the hybrid plasmonic disk includes a plurality of plasmonic regions and a plurality of thermal regions.

10. The heat-assisted magnetic recording head of claim 1, wherein the plurality of plasmonic regions and the plurality of thermal regions are provided in an alternating layered configuration oriented along an axis which is substantially perpendicular to the media-facing surface.

11. The heat-assisted magnetic recording head of claim 1, wherein the peg portion of the near-field emitter is exposed at the media-facing surface.

* * * * *